United States Patent [19]

Eichenauer et al.

[11] Patent Number: 4,764,557
[45] Date of Patent: Aug. 16, 1988

[54] MOULDING COMPOSITIONS OF UNIFORM PARTICLE SIZE AND IMPROVED THERMAL STABILITY

[75] Inventors: Herbert Eichenauer, Dormagen; Alfred Pischtschan, Kuerten; Karl-Heinz Ott, Leverkusen, all of Fed. Rep. of Germany

[73] Assignee: Bayer Aktiengesellschaft, Leverkusen, Fed. Rep. of Germany

[21] Appl. No.: 827,639

[22] Filed: Feb. 10, 1986

[30] Foreign Application Priority Data

Feb. 20, 1985 [DE] Fed. Rep. of Germany ....... 3505748

[51] Int. Cl.[4] ...................... C08L 39/04; C08L 51/04
[52] U.S. Cl. .................................... 525/72; 523/335; 525/73; 525/212

[58] Field of Search .................. 523/335; 525/72, 73, 525/212

[56] References Cited

U.S. PATENT DOCUMENTS 3,520,953 7/1970 Sugimoto et al. .................... 525/212
4,487,857 12/1984 Sugimori et al. .................... 523/335
4,612,347 9/1986 Eichenauer et al. ................. 525/72

Primary Examiner—Jacob Ziegler
Attorney, Agent, or Firm—Connolly and Hutz

[57] ABSTRACT

Elastic-thermoplastic and thermoplastic powder-form moulding compositions of uniform particle size and improved thermal stability at made by incorporating a sulphur containing polymer.

5 Claims, No Drawings

MOULDING COMPOSITIONS OF UNIFORM PARTICLE SIZE AND IMPROVED THERMAL STABILITY

This invention relates to elastic-thermoplastic and to thermoplastic powder-form moulding compositions of uniform particle size and improved thermal stability.

Aqueous polymer latices are normally converted into polymer powders by initiating the coagulation of the latex particles by addition of aqueous salt solutions or dilute acids.

Unfortunately, the coagulated powders generally are obtained with a wide particle size distribution. This gives rise to disadvantages, including for example the danger of dust explosions caused by an excessive percentage of fines and problems during storage, transport and mixing with other powder-form or granular polymers.

Possible methods for reducing the percentage of fines are described, for example, in U.S. Pat. Nos. 3,248,455; 3,249,569 and 3,345,430, according to which either small quantities of water-soluble non-ionic polymers, such as polyethylene oxide, are added to the latex during coagulation or coagulation is carried out using highly concentrated solutions of the coagulant to form a paste-like coagulate.

Apart from an excessive percentage of fines, however, an excessive proportion of coarse-grained powder may also give rise to disadvantages, for example by inclusion of precipitant which is very difficult to wash out. One possible method of reducing the percentage of coarse particles is the process described in Deutsche Auslegeschrift 1,958,498 in which the polymer dispersion and precipitant are intensively mixed under conditions of high turbulence.

Unfortunately, in all these processes only the coarse component or only the fine component is reduced and they need complicated equipment. In addition, the thermo-oxidative behaviour of the resulting polymer powder is not simultaneously improved.

The present invention relates to improved elastic-thermoplastic and to improved thermoplastic powder-form moulding compositions of uniform particle size and improved thermal stability which are obtained by mixing the latex of a moulding composition with from 0.75 to 10 parts by weight (per 100 parts by weight of solids in the latex), preferably with from 1 to 8 parts by weight, more preferably with from 1.5 to 5 parts by weight of a sulfur containing thermoplastic vinyl polymer also in emulsion form, which polymer has a Vicat A/120-softening temperature according to DIN 53460 of from 30° to 95° C., preferably from 40° to 75° C., and a sulphur content introduced by incorporated, optionally substituted thioalkyl groups of from 0.5 to 5.0% by weight, preferably from 0.8 to 3.5% by weight; precipitating the mixture by the addition of coagulating agents at temperatures of from 75° to 120° C., preferably from 80° to 100° C., optionally under pressure, and recovering the polymer.

The moulding compositions of this invention are free-flowing powders of uniform particle size with low content of fine or coarse particles; they show improved thermal stability in the presence of air.

Sulphur containing vinyl polymers in emulsion form suitable for the present invention are those wherein the polymer has a Vicat A/120 softening temperature according to DIN 53 460 of from 30° to 95° C., preferably of from 40° to 75° C.

These values are for the thermoplastic vinyl polymers after recovering from the emulsion by coagulation and subsequent drying. These vinyl polymers have a sulphur content of from 0.5 to 5.0% by weight preferably from 0.8 to 3.5% by weight preferably from 0.8 to 3.5% by weight the sulphur being contained in optionally substituted thioalkyl groups, which are part of the polymer.

Such sulphur containing vinyl polymers in emulsion form are prepared by emulsion polymerization of resin forming vinyl monomers, for example aromatic vinyl compounds of formula (I) or compounds of formula (II) and mixtures thereof:

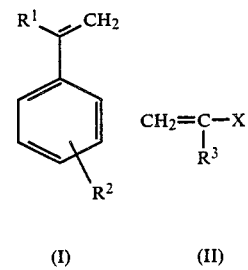

in general formula (I) and (II), $R^1$ represents hydrogen or methyl; $R^2$ represents hydrogen or halogen or $C_1$-$C_3$-alkyl in the ortho, meta or para position; $R^3$ represents hydrogen or methyl; and X represents a cyano (CN), ester (COOR$^4$) or amide group (CONR$^5$R$^6$) wherein $R^4$ represents hydrogen or $C_1$-$C_4$ alkyl and $R^5$ and $R^6$ independently represent hydrogen, phenyl or $C_1$-$C_4$ alkyl.

Examples of compounds of formula (I) are styrene, α-methylstryrene, p-methylstyrene and vinyltoluene. Examples of compounds of formula (II) are acrylonitrile, methacrylonitrile, methylacrylate and methylmethacrylate. Other suitable monomers are, for example, vinyl acetate and N-phenyl maleic imide.

Preferred monomers are mixtures of styrene and acrylonitrile and also mixtures of styrene, acrylonitrile and methylmethacrylate.

These monomers are polymerized in the presence of one or more compounds containing mercapto groups. Suitable mercaptan compounds are, for example, alkyl mercaptans containing from 1 to 18 carbon atoms, mercaptocarboxylic acids and esters thereof containing from 1 to 6 carbon atoms in the alcohol moiety, mercaptoalcohols containing from 2 to 12 carbon atoms or arylalkyl mercaptans containing from 10 to 20 carbon atoms. They are used in a quantity sufficient to achieve a Vicat A/120 softening temperature as given above.

Preferred mercaptans are t-dodecyl mercaptan and n-dodecyl mercaptan or mixtures thereof; preferred thermoplastic emulsion polymers prepared with addition of mercaptans are reaction products of:

(a) from 50 to 80 parts, by weight, of styrene and/or α-methylstyrene;
(b) from 10 to 30 parts, by weight, of acrylonitrile;
(c) from 7.5 to 25 parts, by weight, of t-dodecyl mercaptan.

The emulsion polymerization is carried out using anionic emulsifiers, such as sodium, potassium or ammonium salts of long-chain fatty acids containing from 10 to 20 carbon atoms, for example potassium oleate, alkyl sulphates containing from 10 to 20 carbon atoms, alkylaryl sulphonates containing from 10 to 20 carbon atoms or alkali metal or ammonium salts of disproportionated abietic acid.

Suitable radical-forming initiators are organic and inorganic peroxides, inorganic persulphates, such as potassium persulphate, azo initiators, such as azo-bis-isobutyronitrile, and also Redox systems consisting of an oxidizing agent, preferably a peroxide, and a reducing agent. The polymerization can be carried out at temperatures of from 30° to 100° C., preferably from 50° to 80° C. The preferred initiator is potassium persulphate.

The vinyl polymer emulsion is added to the elastic-thermoplastic or the thermoplastic moulding compositions in latex form in such quantities that from 0.75 to 10% by weight, preferably from 1 to 8% by weight, more preferably from 1.5 to 5% weight vinyl polymer is present, based on the total solids. The addition temperature is from 10° to 80° C., preferably about 20° C.

According to the present invention, various elastic-thermoplastic and thermoplastic polymers in aqueous emulsion form may be converted into powder-form moulding compositions after mixing with the above-mentioned thermoplastic vinyl polymers in emulsion form. The resulting compositions have uniform particle size and improved stability upon heating in the presence of oxygen.

Examples of suitable latices of elastic thermoplastic or thermoplastic polymers are polystyrene, copolymers and terpolymers of optionally nucleus- or side-chain-substituted styrene with other resin-forming monomers, such as (meth)acrylonitrile, methyl(meth)-acrylate, α-methylstyrene, p-methylstyrene, vinyl toluene and other nucleus- or side-chain-substituted styrenes, N(cyclo)alkyl maleic imides, N(alkyl)phenylmaleic imides, for example styrene/acrylonitrile copolymers, styrene/methyl methacrylate copolymers or α-methylstyrene/acrylonitrile copolymers and also the elastic-thermoplastic polymers obtained by polymerization of resin-forming unsaturated compounds in the presence of a rubber-elastic component, for example polybutadiene, polyisoprene or acrylate rubber.

Preferred latices are those obtained by mixing the latex of an elastic-thermoplastic polymer, for example the graft product of a resin-forming monomer, such as styrene, α-methylstyrene, p-methylstyrene, (meth)-acrylonitrile or methyl(meth)-acrylate or mixtures thereof, on polybutadiene or copolymers of butadiene with acrylonitrile and/or styrene with the latex of a rigid and brittle component, for example a styrene or α-methylstyrene or p-methylstyrene/acrylonitrile copolymer and coagulating the latex mixture after mixing with the above-mentioned thermoplastic vinyl polymers present in emulsion form.

Particularly preferred latices are latices of ABS polymers, for example having the following composition:
(A) from 5 to 100%, by weight, preferably from 5 to 80%, by weight, of a graft copolymer obtained by graft polymerization of:
  (1) from 10 to 95%, by weight, preferably from 10 to 80%, by weight, of a mixture of:
    (a) from 50 to 90%, by weight, of styrene, alkyl styrene, methyl methacrylate or mixtures thereof;
    (b) from 50 to 10%, by weight, of acrylonitrile, alkyl acrylonitrile, alkyl methacrylate or mixtures thereof; on
  (2) from 90 to 5%, by weight, preferably from 90 to 20%, by weight, of a polymer of a conjugated diolefin containing at least 80%, by weight, of copolymerized conjugated diolefin; and
(B) from 95 to 0%, by weight, preferably 95 to 20%, by weight, of a thermoplastic copolymer of:
  (a) from 50 to 95%, by weight, of styrene, alkyl styrene, methyl methacrylate or mixtures thereof;
  (b) from 50 to 5%, by weight, of acrylonitrile alkyl acrylonitrile, alkyl methacrylate or mixtures thereof;
the sum of the total of the resin-forming monomers (a) and (b) in components (A) and (B) together not being less than 40%, by weight.

The powder-form ABS moulding compositions according to the present invention may be produced, for example as follows:
(a) In mixing of emulsions of graft polymer (A) and a copolymer (B) with an emulsion of the sulphur containing polymer and coagulating the mixture or
(b) by grafting all resin-forming monomers onto the diene rubber, adding an emulsion of the sulphur containing vinyl polymer and completing the resulting mixture.

Anti-oxidants in dispersion form may optionally be added before coagulation.

In order to be processable the emulsions have to be prepared with emulsifiers which can be deactivated. Examples of suitable emulsifiers are sodium, potassium or ammonium salts of long-chain fatty acids containing from 10 to 20 carbon atoms, alkyl sulphates containing from 10 to 20 carbon atoms, alkylaryl sulphonates containing from containing from 10 to 20 carbon atoms and the alkali metal and ammonium salts of disproportionated abietic acid.

The type of coagulant to be used depends solely on the type of emulsifiers used to stabilize the emulsion. Emulsifiers which emulsify in the acidic and alkaline range (alkyl sulphates, alkylaryl sulphonates and alkyl sulphonates) preferably require electrolytes, such as calcium chloride, magnesium sulphate or aluminium sulphate in the form of aqueous solutions as precipitants. In the case of emulsifiers which have no emulsifying effect at pH values below 7, it is sufficient to use acids, such as acetic acid, for coagulation.

Where an aqueous solution is used as the precipitant, its concentration is preferably from 0.5 to 25% for electrolytes and from 0.5 to 90% for acids. Short-chain carboxylic acids, for example acetic acid, may also be used in pure form.

The quantity of precipitant preferably amounts to from 0.01 to 20 % of the solid polymer.

The coagulated powder-form moulding compositions are processed by methods known from the literature, more especially by filtration or centrifugation and subsequent drying.

EXAMPLES AND COMPARISON EXAMPLES

In the following Examples parts are by weight and are based on solid constituents or polymerizable constituents.

EXAMPLE 1

Preparation of a reaction product of styrene, arylonitrile and t-dodecyl mercaptan present in emulsion form:

3.06 parts of styrene, 1.19 parts of acrylonitrile and 0.75 part of t-dodecyl mercaptan are emulsified under nitrogen in 68 parts of water using 0.08 part of the sodium salt of disproportionated abietic acid, after which 0.3 part of potassium persulphate (dissolved in 24 parts of water) is added and the mixture is heated to 65° C. Thereafter, a mixture of 58.14 part of styrene, 22.61 parts of acrylonitrile and 14.25 parts of t-dodecyl mercaptan and a solution of 1.92 part of the sodium salt of disproportionated abietic acid in 25 parts of water are added over a period of 4 hours, the reaction temperature of 65° C. being maintained. Following an after-reaction time, part of the latex is coagulated in a cold solution of magnesium sulphate in acetic acid. The polymer obtained after drying in vacuo at 70° C. has a sulphur content of 2.3% and a Vicat A/120 softening temperature of 62° C. (as measured on a test specimen measuring 10 mm×10 mm×4 mm).

EXAMPLE 2

Preparation of a reaction product of styrene, acrylonitrile and mercaptoacetic acid ethyl ester present in emulsion form:

3.24 parts of styrene, 1.26 parts of acrylonitrile and 0.5 part of mercaptoacetic acid ethyl ester are emulsified under nitrogen in 67 parts of water using 0.08 part of the sodium salt of n-dodecyl benzene sulphonic acid, after which 0.3 part of potassium persulphate (dissolved in 28 parts of water) is added and the mixture is heated to 65° C. A mixture of 61.56 parts of styrene, 23.94 parts of acrylonitrile and 9.5 parts of mercaptoacetic acid ethyl ester and a solution of 1.92 parts of the sodium salt of n-dodecyl benzene sulphonic acid (dissolved in 25 parts of waer) are then continuously added over a period of 4 hours during which the reaction temperature of 65° C. is maintained. Following an after reaction time, part of the latex is coagulated in a cold solution of magnesium sulphate in acetic acid, after which the polymer is dried in vacuo at 70° C.

The polymer has a sulphur content of 2.65% and a Vicat A/120 softening temperature of 57° C. (as measured on a test specimen measuring 10 mm×10 mm×4 mm).

EXAMPLE 3

Preparation of a reaction product of styrene, acrylonitrile and 3-mercaptopropionic acid methyl ester present in emulsion form:

3.24 parts of styrene, 1.26 parts of acrylonitrile and 0.5 part of 3-mercaptopropionic acid methyl ester are emulsified under nitrogen in 67 parts of water using 0.08 part of the sodium salt of n-dodecylbenzene sulphonic acid as emulsifier, after which 0.3 art of potassium persulphate (dissolved in 24 parts of water) is added and the mixture is heated to 65° C. A mixture of 61.56 parts of styrene, 23.94 parts of acrylonitrile and 9.5 part of 3-mercaptopropionic acid methyl ester and a solution of 1.92 parts of the sodium salt of n-dodecyl benzene sulphonic acid (dissolved in 25 parts of water) are continuously added over a period of 4 hours during which the reaction temperature is maintained at 65° C. Following an after-reaction time, part of the latex is coagulated in a cold solution of magnesium sulphate in acetic acid. The polymer obtained after drying in vacuo at 70° C. has a sulphur content of 2.6% and a Vicat A/120 softening temperature of 53° C. (as measured on a test specimen measuring 10 mm×10 mm×4 mm).

EXAMPLES 4 to 13

Preparation of elastic-thermoplastic powder-form moulding compositions

After the addition of 1.2 parts of anti-oxidant (based on 100 parts of polymer solids), quantities of 900 g of a 33% graft polymer latex of 36 parts of styrene and 14 parts of acrylonitrile on 50 parts of polybutadiene, in the production of which 1.5 parts of the sodium salt of disproportionated abietic acid was used as emulsifier, are mixed with the quantities indicated in Table 1 of the latex of Example 1, after which the latex mixture is added to a solution of 32 g of magnesium sulphate MgSO$_4$.7H$_2$O) and 16 g of acetic in 1.6 liters of deionized water in precipitation vessel equipped with a propeller stirrer.

The mixture is heated to 98° C., coagulating completely. After filtration of the precipitation mixture, the polymer is dried in vacuo at 70° C. and the particle size distribution determined by sieve analysis (see Table 1) using a test sieve machine equipped with vibratory sieves (manufacturers: Haver and Boecker) standardized in accordance with DIN 4188.

TABLE 1

Particle size distribution of elastic-thermoplastic powder-form moulding compositions

| Example No. | Quantity used of the latex of Example 1 [parts, by weight, of latex solids (latex Example 1) per 100 parts, by weight, of latex solids to be coagulated] | Particle size distribution [%] >1 mm | 1 to 0.1 mm | <0.1 mm |
| --- | --- | --- | --- | --- |
| 4 (comparison) | — | 84.06 | 15.86 | 0.08 |
| 5 (comparison) | 0.5 | 80.69 | 18.91 | 0.40 |
| 6 | 1 | 11.69 | 82.08 | 6.23 |
| 7 | 2.5 | 7.24 | 86.35 | 6.41 |
| 8 | 5 | 6.97 | 90.16 | 2.87 |
| 9 | 7.5 | 5.91 | 91.74 | 2.35 |
| 10 | 10 | 25.24 | 71.86 | 2.90 |
| 11 (comparison) | 20 | 34.08 | 59.89 | 6.03 |
| 12 (comparison) | 30 | 51.66 | 47.35 | 0.99 |
| 13 (comparison) | 40 | 46.43 | 52.95 | 0.62 |

EXAMPLE 14

Preparation of an elastic-thermoplastic powder-form moulding composition according to the present invention 900 g of the graft polymer latex described in Examples 4 to 13 are mixed with 20 g of the latex of Example 1 without addition of anti-oxidant, after which the latex mixure is coagulated as in Examples 4 to 13 and converted into a dry polymer powder. The powder having a particle size of from 1 to 0.1 mm is tested for its thermal stability by DSC measurements using a Perkin-Elmer DSC 2 apparatus:

isothermal measurement at 160° C. (purging gas oxygen 3.6 l/h): induction time to maximum oxidation rate: 12.3 mins.

dynamic measurement (purging gas oxygen 3.6 l/h, heating rate 20° K./min.): maximum of the exothermic reaction at T=203° C.

EXAMPLE 15

Preparation of a comparison elastic-thermoplastic powder-form moulding composition 900 g of the graft polymer latex described in Examples 4 to 13 are coagulated as in Examples 4 to 13 without addition of anti-oxidant and without addition of the latex of Example 1 and converted into dry polymer powder. The powder which has a particle size of from 1 to 0.1 mm is tested for its thermal stability by DSC measurments using a Perkin-Elmer DSC 2 apparatus:

isothermal measurement at 160° C. (purging gas oxygen 3.6 l/h); induction time to maximum oxidation rate=2.7 mins.

dynamic measurement (purging gas oxygen 3.6 l/h, heating rate 20° K.(min.): maximum of the exothermic reaction at T=185° C.

EXAMPLE 16

Preparation of a mixture of elastic-thermoplastic and thermoplastic powder-form moulding composition according to the present invention After the addition of 1.2 parts of anti-oxidant (based on 100 parts of polymer solids), a mixture of 363 g of 33% graft polymer latex of 36 parts of styrene and 14 parts of acrylonitrile on 50 parts of polybutadiene, in the production of which 1.5 parts of the sodium salt of disproportionated abietic acid was used as emulsifier, and 400 g of a 45% styrene-acrylonitrile copolymer latex obtained by copolymerization of 72 parts of styrene and 28 parts of acrylonitrile using 2.0 parts of the sodium salt of disproportionated abietic acid as emulsifier is mixed with 50 g of the latex of Example 1, after which the latex mixture is added to a solution of 32 g of magnesium sulphate ($MgSO_4.7H_2O$) and 16 g of acetic acid in 1.6 l of deionized water in a precipitation vessel equipped with a propeller stirrer. The mixture is heated to from 98 to 100° C. and coagulates completely. After filtration of the precipitation mixture, the polymer is dried in vacuo at 70° C. and the particle size distribution is determined by sieve analysis.

Particle size distribution:
>1 mm: 1.59%
1 to 0.1 mm: 92.26%
<0.1 mm: 6.15%

EXAMPLE 17

Preparation of a comparison mixture of elastic-thermoplastic and thermoplastic powder-form moulding composition.

Without addition of the latex of Example 1, the mixture of graft polymer lates and styrene-acrylonitrile copolymer latex described in Example 16 is added to a solution of 30 g of magnesium sulphate ($MgSO_4.7H_2O$) and 15 g of acetic acid in 1.6 l of deionized water in precipitation vessel equipped with a propeller stirrer, after which the mixture is coagulated at from 98° to 100° C. After filtration of the precipitation mixture, the polymer is dried in vacuo at 70° C. and the particle size distribution determined by sieve analysis:

Particle size distribution
>1 mm: 74.77%
1 to 0.1 mm: 23.50%
<0.1 mm: 1.73%

We claim:

1. An improved elastic-thermoplastic and thermoplastic powder-form moulding composition mixture prepared by the process which comprises mixing (i) a latex of a polymeric moulding composition with (ii) from 0.75 to 10 parts by weight, based on 100 parts by weight of latex solids, of a thio containing thermoplastic vinyl polymer in emulsion form, said vinyl polymer in emulsion form, said vinyl polymer having a Vicat A/120 softening temperature of from 30° to 95° C. and a content of thioalkyl groups of from 0.5 to 5.0% by weight, and precipitating the moulding composition mixture by addition of coagulating reagents at from 75° to 120° C. and recovering the polymer mixture.

2. The composition as claimed in 1 wherein from 1 to 8 parts, by weight, of thermoplastic vinyl polymer is used.

3. The composition as claimed in claim 1 wherein the sulphur content is from 0.8 to 3.5%, by weight.

4. The composition as claimed in claim 1 wherein the sulphur-containing thermoplastic vinyl polymer is a reaction product of styrene, α-methylstyrene, p-methylstyrene, vinyl toluene methacrylonitrile, acrylonitrile, methylacrylate methyl methacrylate, N-phenyl maleic imide or mixtures thereof and a mercapto group-containing compound.

5. The composition as claimed in claim 1 wherein the sulphur-containing thermoplastic vinyl polymer is a reaction product of:
(a) from 50 to 80 parts, by weight, of styrene, α-methylstyrene or mixtures thereof;
(b) from 10 to 30 parts, by weight of acrylonitrile; and
(c) from 7.5 to 25 parts by weight of t-dodecyl mercaptan.

* * * * *